US012609097B2

(12) United States Patent
Jin et al.

(10) Patent No.: US 12,609,097 B2
(45) Date of Patent: Apr. 21, 2026

(54) PRESSURE-RESISTANT UNDERWATER ACOUSTIC COATING STRUCTURE WITH MESH STRUCTURE INTERLAYER

(71) Applicant: Harbin Engineering University, Harbin (CN)

(72) Inventors: Guoyong Jin, Harbin (CN); Xinyu Jia, Harbin (CN); Tiangui Ye, Harbin (CN); Yan Yan, Harbin (CN); Shuo Wang, Harbin (CN); Xudong Pan, Harbin (CN); Yang Shangguan, Harbin (CN); Yaowei Yin, Harbin (CN)

(73) Assignee: Harbin Engineering University, Harbin (CN)

( * ) Notice: Subject to any disclaimer, the term of this patent is extended or adjusted under 35 U.S.C. 154(b) by 296 days.

(21) Appl. No.: 18/235,756

(22) Filed: Aug. 18, 2023

(65) Prior Publication Data

US 2024/0127781 A1 Apr. 18, 2024

(30) Foreign Application Priority Data

Oct. 13, 2022 (CN) ......................... 202211252564.5

(51) Int. Cl.
*G10K 11/168* (2006.01)

(52) U.S. Cl.
CPC .................................. *G10K 11/168* (2013.01)

(58) Field of Classification Search
CPC .................................................... G10K 11/168
USPC .......................................................... 181/290
See application file for complete search history.

(56) References Cited

U.S. PATENT DOCUMENTS

| | | | | | |
|---|---|---|---|---|---|
| 3,977,492 | A * | 8/1976 | Hankel | B32B 15/02 428/116 |
| 4,641,726 | A * | 2/1987 | Fearon | E04C 2/365 428/116 |
| 9,334,059 | B1 * | 5/2016 | Jones | G10K 11/168 |
| 10,131,110 | B2 * | 11/2018 | Oleske | B32B 3/12 |
| 11,624,280 | B2 * | 4/2023 | Whiteley | E21D 19/00 405/302.1 |
| 2003/0207054 | A1 * | 11/2003 | Magnusson | B32B 27/06 428/34.2 |
| 2012/0269995 | A1 * | 10/2012 | Leighton | B32B 27/08 428/34 |

* cited by examiner

*Primary Examiner* — Forrest M Phillips
(74) *Attorney, Agent, or Firm* — Bochner PLLC; Andrew D. Bochner

(57) ABSTRACT

Provided is a pressure-resistant underwater acoustic coating structure with a mesh structure interlayer, including an outer coating, a mesh structure interlayer, an inner coating, and a metal backing; wherein the outer coating is used for inputting acoustic waves, the mesh structure interlayer and the inner coating are used for consuming acoustic wave energy, and the metal backing is used for enriching a sound absorption mode; and the outer coating, the mesh structure interlayer, the inner coating and the metal backing are attached in sequence.

8 Claims, 3 Drawing Sheets

PRESSURE-RESISTANT UNDERWATER ACOUSTIC COATING STRUCTURE WITH MESH STRUCTURE INTERLAYER

CROSS-REFERENCE TO RELATED APPLICATION

This patent application claims the benefit and priority of Chinese Patent Application No. 202211252564.5 filed with the China National Intellectual Property Administration on Oct. 13, 2022, the disclosure of which is incorporated by reference herein in its entirety as part of the present application.

TECHNICAL FIELD

The present disclosure relates to the technical field of vibration damping and noise reduction, and in particular to a pressure-resistant underwater acoustic coating structure with a mesh structure interlayer.

BACKGROUND

Acoustic coating technology is the key to achieve acoustic cloaking of underwater vehicles, and the research on acoustic characteristics of the acoustic coating has become a hot research field. With the increasing diving depth of the underwater vehicle and the development of anti-submarine detection technology to low frequency, the underwater acoustic coating is developing to low frequency and broadband sound absorption. Moreover, new requirements are put forward for the pressure resistance of the coating under high hydrostatic pressure.

In order to obtain better low-frequency sound absorption effect, the acoustic coating for the underwater vehicle, which is widely used at present, is mostly composed of a viscoelastic material with a cavity structure. By using the resonance and scattering effect brought by the cavity structure, the cavity-type acoustic coating could obtain a certain sound absorption effect in the low frequency range. However, the high-frequency sound absorption effect of the structure is greatly reduced, and the cavity structure will be deformed greatly under high hydrostatic pressure, which is difficult to meet the acoustic technical requirements of the acoustic coating. Mesh structures have been widely concerned and researched in the field of vibration damping and noise reduction technology since they were proposed because of their unique solid characteristics and acoustic vibration characteristics.

To sum up, traditional acoustic coatings cannot meet the requirements of the existing underwater vehicles for the acoustic performance of the acoustic coating due to the narrow sound absorption band and poor underwater pressure resistance. Therefore, it is necessary to design a pressure-resistant underwater acoustic coating structure with a mesh structure interlayer to improve such deficiencies of the traditional acoustic materials. However, no relevant research work has been found in domestic and foreign literatures.

SUMMARY

An object of the present disclosure is to provide a pressure-resistant underwater acoustic coating structure with a mesh structure interlayer according to metal features and broadband characteristics of the mesh structure, so as to meet the requirement that the coating has a good sound absorption effect under deep-sea high hydrostatic pressure.

In order to achieve the above object, the present disclosure provides the following technical solutions:

A pressure-resistant underwater acoustic coating structure with a mesh structure interlayer, including:

an outer coating, a mesh structure interlayer, an inner coating, and a metal backing;

where the outer coating is used for inputting acoustic waves; the mesh structure interlayer and the inner coating are used for consuming acoustic wave energy; and the metal backing is used for enriching a sound absorption mode; and the outer coating, the mesh structure interlayer, the inner coating and the metal backing are attached in sequence.

In some embodiments, the outer coating is made a material that matches with impedance of a fluid medium.

In some embodiments, the inner coating is made of a sound absorbing material.

In some embodiments, the outer coating has a thickness of 5 mm to 10 mm, and the inner coating has a thickness of 5 mm to 10 mm.

In some embodiments, the mesh structure interlayer includes:

a plurality of regular polygonal metal lattices; and a vertex of each of the regular polygon metal lattices is arranged to share the vertex with an adjacent regular polygon metal lattice.

In some embodiments, each of the regular polygonal metal lattices includes:

a regular hexagonal metal lattice;

where the regular hexagonal metal lattice includes a hexagonal frame, and isosceles triangular metal counterweight units; and impedance characteristics of the mesh structure interlayer are regulated by adjusting dimensions and material parameters of the hexagonal frame and the isosceles triangular metal counterweight units.

In some embodiments, a metal matrix of the network structure interlayer is made of a material selected from the group consisting of titanium, aluminum and iron.

In some embodiments, the metal backing is made of any one of steel or lead.

The embodiments of the present disclosure have the following beneficial effects:

In the present disclosure, the mesh structure interlayer is filled in a large cavity structure between the inner coating and the outer coating for supporting, such that a cavity type acoustic coating structure having a low-frequency sound absorption effect could be obtained, and the pressure resistance of the structure under the action of hydrostatic pressure could be improved. The acoustic wave energy in the mesh structure interlayer is transmitted in a longitudinal direction, which makes a chord-like vibration of the mesh structure more intense, aggravates the dissipation of acoustic wave energy in the structure, thereby effectively broadening the sound absorption band of acoustic coating.

BRIEF DESCRIPTION OF THE DRAWINGS

To describe the technical solutions in the embodiments of the present disclosure or in the prior art more clearly, the accompanying drawings used in the embodiments will be briefly introduced. Apparently, the accompanying drawings in the following description are merely a part of the embodiments of the present disclosure, and other drawings could be obtained by those skilled in the art according to the accompanying drawings without creative efforts.

Figure 1:
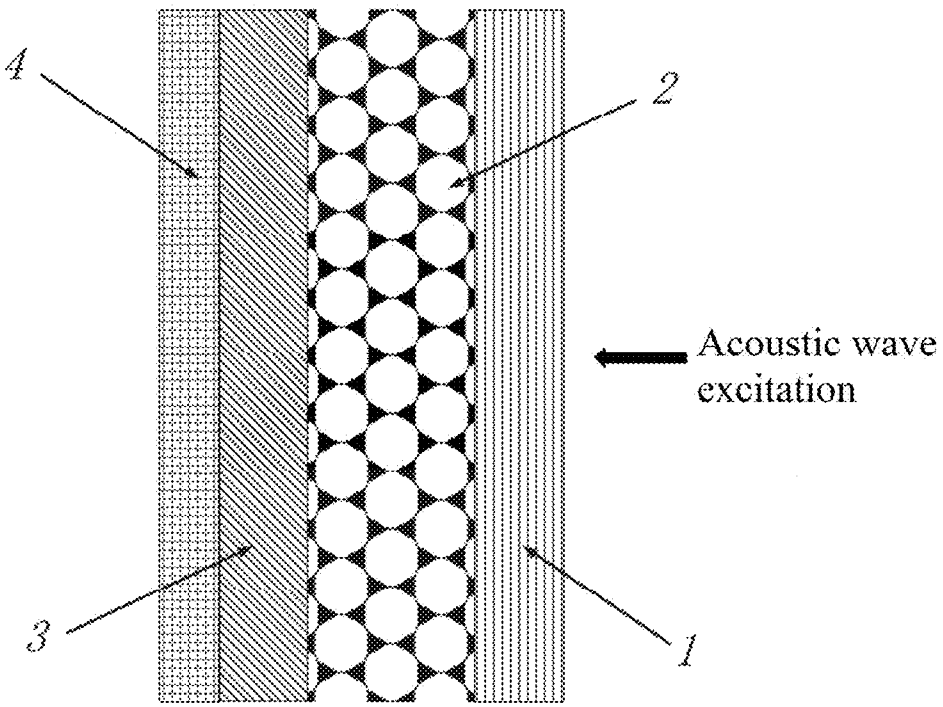
FIG. 1 shows a schematic diagram of the pressure-resistant underwater acoustic coating structure with a mesh structure interlayer according to an embodiment of the present disclosure.

In the drawings: 1 refers to an outer coating; 2 refers to a mesh structure interlayer; 3 refers to an inner coating; 4 refers to a metal backing; 5 refers to a thin metal rod; and 6 refers to a metal counterweight unit.

DETAILED DESCRIPTION OF THE EMBODIMENTS

The technical solution of the disclosure will be described clearly and completely with reference to the accompanying drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the scope of the present disclosure.

To make the object, features and advantages of the present disclosure more apparently and understandably, the technical solutions of the disclosure will be further described in detail with reference to the accompanying drawings and specific examples.

In an example, as shown in FIG. 1, a pressure-resistant underwater acoustic coating structure with a mesh structure interlayer is provided. Acoustic wave excitation is incident along an arrow direction in FIG. 1. The acoustic structure is sequentially composed of an outer coating 1, a mesh structure interlayer 2, an inner coating 3, and a metal backing 4; and the outer coating, the mesh structure interlayer, the inner coating and the metal backing are attached in sequence.

The outer coating 1 is made of a material that matches with impedance of a fluid medium, including polyurethane with good impedance-matching with water, so as to ensure that acoustic waves could effectively enter the acoustic coating. The outer coating has a thickness of 5 mm to 10 mm. The inner coating 3 is made of a sound absorbing material, including viscoelastic sound absorbing rubber, so as to satisfy the dissipation of the acoustic waves within the structure. The inner coating has a thickness of 5 mm to 10 mm.

A metal backing 4 is provided behind the inner coating, so as to further enrich sound absorption modes of the structure. The metal backing array be made of steel, lead or other metals. In some embodiments, the metal backing is made of steel.

Figure 2:
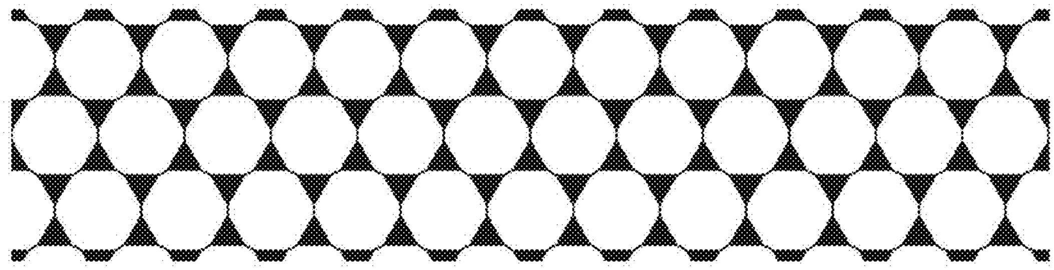
FIG. 2 shows a schematic diagram of the mesh structure interlayer according to an embodiment of the present disclosure.

As shown in FIG. 2, the mesh structure interlayer 2 is located between the outer coating 1 and the inner coating 3. The mesh structure interlayer 2 includes a plurality of regular polygonal metal lattices; and a vertex of each of the regular polygonal metal lattices is arranged to share the vertex with an adjacent regular polygonal metal lattice, and adjacent lattices are centrally symmetrical.

Figure 3:
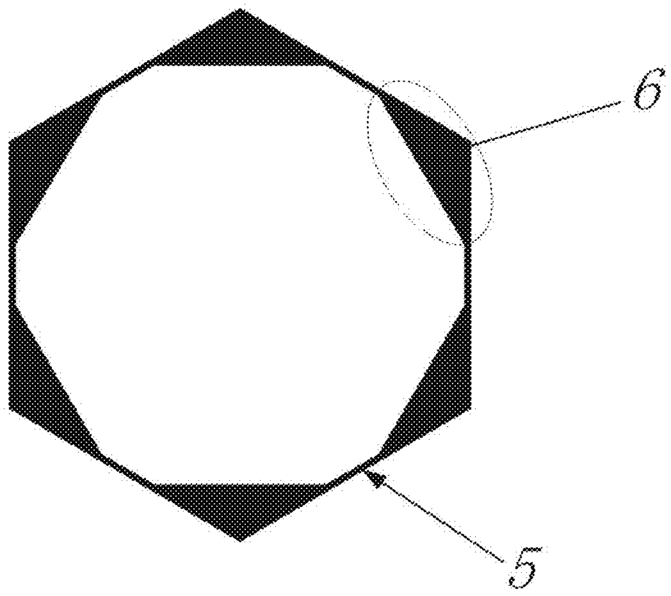
FIG. 3 shows a schematic diagram of the regular hexagonal metal lattice according to an embodiment of the present disclosure.

Each of the regular polygonal metal lattices includes a regular hexagonal metal lattice, where the regular hexagonal metal lattice includes a hexagonal frame, and isosceles triangular metal counterweight units. Impedance characteristics of the mesh structure interlayer are regulated by adjusting dimensions and material parameters of the hexagonal frame and the isosceles triangular metal counterweight units, which is shown as follows:

As shown in FIG. 3, each of the regular polygonal metal lattices includes a hexagonal unit, where the hexagonal unit is composed of regular hexagonal metal lattices which are interconnected and closely arranged together and are centrally symmetrical. Each hexagon unit is formed by six identical isosceles triangular metal counterweight units 6 and one regular hexagonal thin metal rod 5 connecting area, and the six isosceles triangular structures are evenly distributed at six vertices of a regular hexagonal connecting area. The centrally symmetrical units are connected by the hexagonal metal frame structure. The impedance characteristics of the mesh structure interlayer could be regulated by adjusting dimensions and material parameters of the thin metal rods and metal counterweight units of the regular hexagonal metal lattice.

Through structural design and selecting appropriate materials, the impedance characteristic of the metal-based mesh material could be regulated to better match with adjacent materials, and there are many candidate metal matrixes such as titanium, aluminum and iron. In some embodiments, the mesh structure is made of titanium. The mesh structure interlayer has a thickness of 24.7 mm, and the hexagonal lattice of the mesh structure interlayer is composed of thin metal rods with a side length of 5 mm and a thickness of 0.12 mm and isosceles triangular metal counterweight units with a size of 1.07 mm×3.22 mm. In engineering preparation, the mesh structure interlayer could be obtained by 3D printing.

In this embodiment, specific material parameters of the structure are as follows: titanium [density $\rho$=4,400 kg/m$^3$, elastic modulus E=$1.1\times10^{11}$ Pa, and Poisson's ratio v=0.33]; steel [density $\rho$=7,890 kg/m$^3$, elastic modulus E=$2.06\times10^{11}$ Pa, and Poisson's ratio v=0.33]; polyurethane [density $\rho$=110 kg/m$^3$, elastic modulus E=$1.4\times10^8$ Pa, loss factor $\eta$=0.3, and Poisson's ratio v=0.49], sound absorbing rubber [density $\rho$=1,000 kg/m$^3$, elastic modulus E=$1.8\times10^7$ Pa, loss factor $\eta$=0.3, and Poisson's ratio v=0.495].

Figure 4:
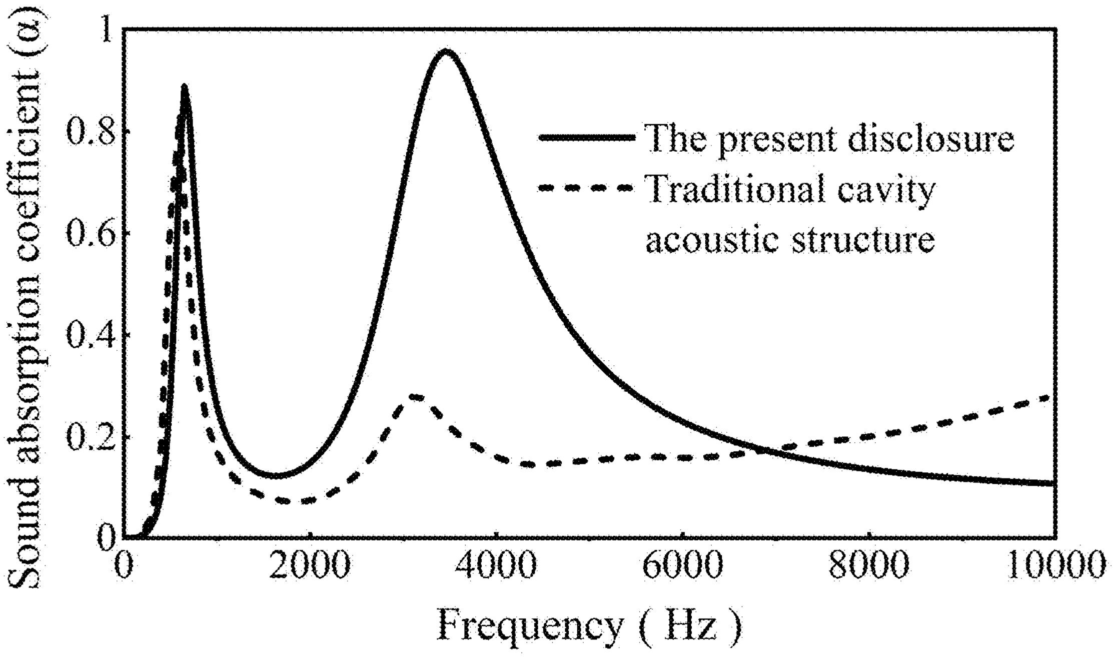
FIG. 4 shows a comparison diagram of sound absorption coefficients of the pressure-resistant underwater acoustic coating structure with a mesh structure interlayer according to an embodiment of the present disclosure and a pure cavity type acoustic coating.
Figure 5:
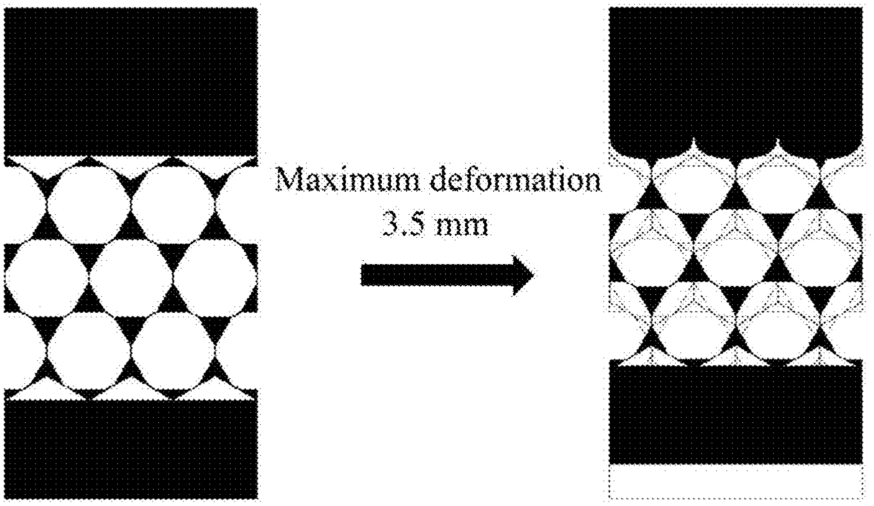
FIG. 5 shows a deformation of the pressure-resistant underwater acoustic coating structure with a mesh structure interlayer according to an embodiment of the present disclosure under 3 MPa.

An operation mode and acoustic characteristics of the present disclosure are described in detail by means of a simulation calculation:

As shown in FIG. 4, the underwater sound absorption performance of the pressure-resistant underwater acoustic coating structure with a mesh structure interlayer of the present disclosure is simulated and calculated by using a finite element method, and the result is compared with that of the traditional cavity type acoustic coating structure. Under the condition that the acoustic coating has the same size, the pressure-resistant underwater acoustic coating structure with a mesh structure interlayer of the present disclosure not only keeps the sound absorption intensity of the underwater acoustic coating at a low frequency, but also greatly improves the sound absorption effect of the structure in the frequency range from 2,000 HZ to 6,000 HZ, which effectively broadens the sound absorption frequency band of the structure. Due to special physical properties of the mesh structure, a chord-like vibration of the mesh structure itself in a specific frequency range excited by incident acoustic waves, and a transmission of the acoustic wave energy in a longitudinal direction in the mesh structure layer, the chord-like vibration of the mesh structure becomes more intense, which aggravates the dissipation of acoustic wave energy in the structure; thus, the sound absorption effect of the structure in this frequency range is greatly improved. In addition, the mesh structure is made of metal, which makes the mesh structure have better structural strength. Therefore, the pressure resistance of the cavity type acoustic coating under the hydrostatic pressure could be effectively improved by the mesh structure interlayer. As shown in FIG. 5, the impedance characteristics of the mesh structure interlayer are regulated by adjusting dimensions and material parameters of the thin metal rods and metal counterweight units of the regular hexagonal metal lattice.

As shown in FIG. 5, under the hydrostatic pressure of 3 MPa, the maximum deformation of the pressure-resistant underwater acoustic coating structure with a mesh structure interlayer of the present disclosure is only about 3.5 mm, indicating that the supporting effect of the mesh structure interlayer on the cavity greatly improves the ability of the structure to resist deformation. According to the characteristics of the present disclosure, the pressure-resistant underwater acoustic coating structure with a mesh structure interlayer could be applied to design the acoustic coating for an underwater vehicle, which could improve the sound absorption effect of the acoustic coating, and improve the pressure resistance of the structure under the hydrostatic pressure; thus, the pressure-resistant underwater acoustic coating structure with a mesh structure interlayer of the present disclosure has good engineering application prospects.

The above embodiments are only a description of the preferred embodiments of the present disclosure, rather than limiting the scope of the present disclosure. Various deformations and modifications made to the technical solutions of the present disclosure by those skilled in the art without departing from the spirit of the design of the present disclosure shall fall within the scope of the present disclosure determined by the claims.

What is claimed is:

1. A pressure-resistant underwater acoustic coating structure with a mesh structure interlayer, comprising:

an outer coating, the mesh structure interlayer, an inner coating, and a metal backing;

wherein the outer coating is used for inputting acoustic waves; the mesh structure interlayer and the inner coating are used for consuming energy of the acoustic waves; and the metal backing is used for enriching a sound absorption mode; and the outer coating, the mesh structure interlayer, the inner coating, and the metal backing are attached in sequence.

2. The pressure-resistant underwater acoustic coating structure with the mesh structure interlayer of claim 1, wherein the outer coating is made of a material that matches with impedance of a fluid medium.

3. The pressure-resistant underwater acoustic coating structure with the mesh structure interlayer of claim 1, wherein the inner coating is made of a sound absorbing material.

4. The pressure-resistant underwater acoustic coating structure with the mesh structure interlayer of claim 1, wherein the outer coating has a thickness of 5 mm to 10 mm, and the inner coating has a thickness of 5 mm to 10 mm.

5. The pressure-resistant underwater acoustic coating structure with the mesh structure interlayer of claim 1, wherein the mesh structure interlayer comprises:

a plurality of regular polygonal metal lattices;

wherein a vertex of each of the regular polygon metal lattices is arranged to share the vertex with an adjacent regular polygon metal lattice.

6. The pressure-resistant underwater acoustic coating structure with the mesh structure interlayer of claim 5, wherein each of the regular polygonal metal lattices comprises:

a regular hexagonal metal lattice;

wherein the regular hexagonal metal lattice comprises a hexagonal frame, and isosceles triangular metal counterweight units; and impedance characteristics of the mesh structure interlayer are regulated by adjusting dimensions and material parameters of the hexagonal frame and the isosceles triangular metal counterweight units.

7. The pressure-resistant underwater acoustic coating structure with the mesh structure interlayer of claim 1, wherein a metal matrix of the mesh structure interlayer is made of a material selected from the group consisting of titanium, aluminum, and iron.

8. The pressure-resistant underwater acoustic coating structure with the mesh structure interlayer of claim 1, wherein the metal backing is made of a material selected from the group consisting of steel and lead.

* * * * *